United States Patent [19]

Van Derlin

[11] Patent Number: 4,500,127
[45] Date of Patent: Feb. 19, 1985

[54] BELT CLAMP FOR CONVEYOR BELTS

[76] Inventor: Donald H. Van Derlin, P.O. Box 261, North Bend, Oreg. 97459

[21] Appl. No.: 419,085

[22] Filed: Sep. 16, 1982

[51] Int. Cl.³ .......................... B25B 5/04; B66F 19/00
[52] U.S. Cl. ................................... 294/104; 254/199; 294/132
[58] Field of Search ............... 294/1 R, 86 R, 103 R, 294/104, 132–136; 24/132 R, 132 AA, 133, 134 R, 134 L, 134 N, 265 R; 29/283; 254/199, 250, 251; 269/238

[56] References Cited

U.S. PATENT DOCUMENTS

| | | |
|---|---|---|
| 888,561 | 5/1908 | Whitehead .......................... 294/132 |
| 937,260 | 10/1909 | Nummy ............................ 294/132 |
| 1,046,450 | 12/1962 | Dillon ............................. 294/132 |
| 1,104,600 | 7/1914 | Young et al. ...................... 294/132 |
| 2,480,796 | 8/1949 | Ward ............................. 294/132 |
| 2,942,847 | 6/1960 | Ausman ........................ 254/250 X |
| 3,052,448 | 9/1962 | Nauen et al. ....................... 294/1 R |
| 3,881,690 | 5/1975 | Combs ............................. 294/133 |

FOREIGN PATENT DOCUMENTS 1154373  6/1969  United Kingdom .
630136  10/1978  U.S.S.R. .

Primary Examiner—Johnny D. Cherry
Attorney, Agent, or Firm—Klarquist, Sparkman, Campbell, Leigh & Whinston

[57] ABSTRACT

A pair of belt clamps is used for tensioning a conveyor belt to join its ends. Each clamp comprises a channel member and a rectangular bar member sized to span the width of the belt. The channel member has parallel sidewalls and a center wall defining two channels sized to receive the narrow dimension of the bar member together with a thickness of the belt. Two pivotable links connect the ends of the bar member to the end of the center wall. The clamp is connected to a conventional haulage device via a rigid loop mounted on the bar member radially of the axis of rotation of such member about the connecting links. Pulling the loop lengthwise of the belt rotates the bar member into one of the channels to clamp the belt therein. The sidewall of the unused channel engages the underside of the belt to resist any tendency of the channel member to rotate.

10 Claims, 5 Drawing Figures

U.S. Patent   Feb. 19, 1985   4,500,127
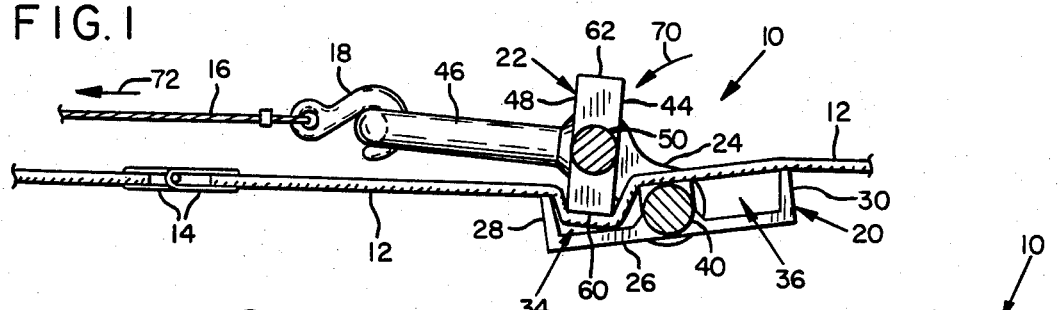
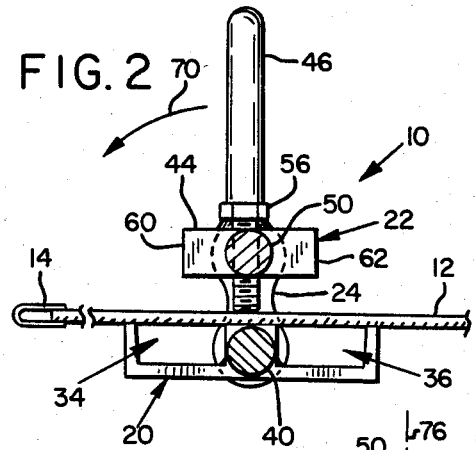
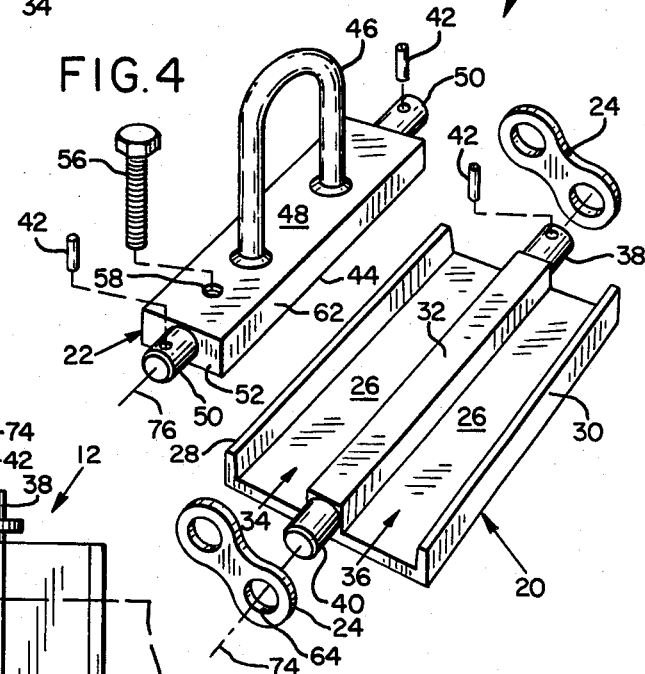
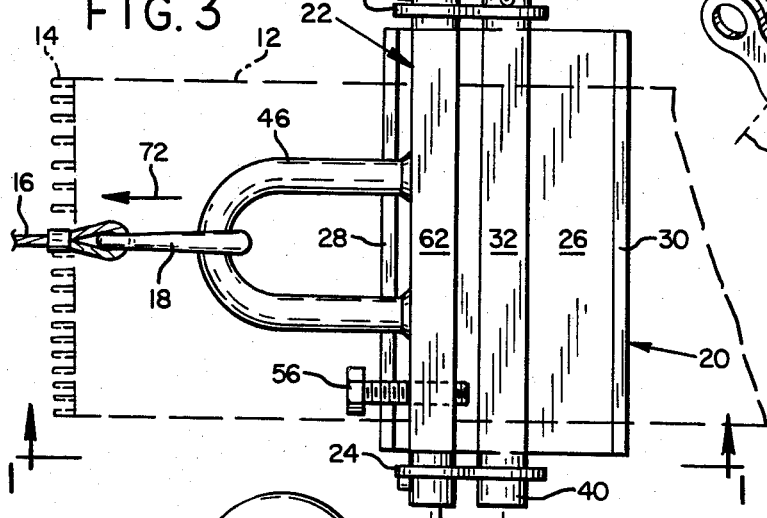
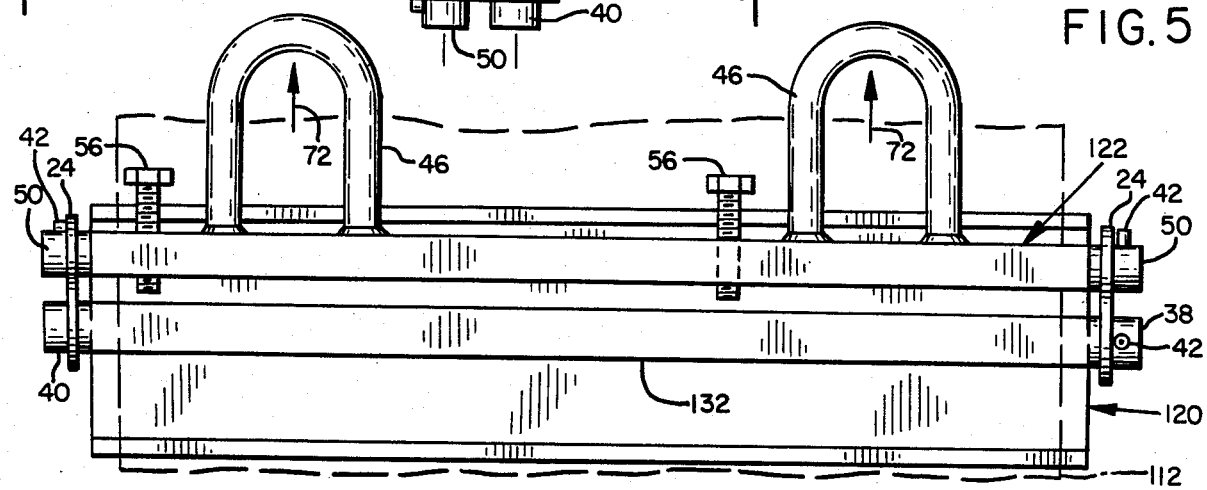

BELT CLAMP FOR CONVEYOR BELTS

BACKGROUND OF THE INVENTION

This invention relates generally to apparatus for drawing the ends of endless conveyor belts together for interconnection and more particularly to full width belt clamps for highly tensioning conveyor belts.

Fabric endless conveyor belts are widely used in plywood veneer mills and many other manufacturing applications. The belts operate at high speed under high tension and are often positioned in raceways. The belts can range from a few feet to dozens of feet in length. They are typically 3/16" to ¼" thick and can be from a few inches to over 2' wide. Installation, replacement or repair of such belts requires drawing their ends together under tension for fastening. A variety of devices have been proposed for bringing together the ends of a broken endless conveyor belt to facilitate joining the ends. An example of such a device is shown in British Pat. No. 1,154,373 to Cook, et al.

One of the principal difficulties in the operation of such devices is securely connecting the pulling device to the ends of the belt. Soviet Union Patent No. 630,136 to Fedorov, et al. discloses a clamping device which clamps the margins of the belt. Devices such provide a similar function are known in the United States. A principal drawback of such clamping devices is that they do not clamp the entire width of the belt and thus apply most of the tension along the margins of the belt. As tension is applied, the centerline of the belt is not stretched as much as the margins, making it difficult to secure the ends together. Moreover, such clamping devices are subject to slippage. This clamping device is also inconvenient to use in raceways.

The aforementioned Cook, et al. patent uses a clamping device having a pair of eccentrically mounted parallel rollers, between which a length of conveyor belting is gripped. Although this clamping device spans the entire width of the belting, it slips under high tension. Also, because it is connected to the haulage device by means of two cables extending between the ends of both rollers, it cannot be conveniently used on short belts. Furthermore, the eccentric rollers and cable are difficult to fit into the raceways and to remove once the belt ends are connected together.

A third type of belt clamp is also known which utilizes a channel member which fits under the belt, the belt lying lengthwise in the channel. A rod extends across the belt between the sides of the channel member, which are slotted at an angle so as to force the rod downwardly in a camming action to clamp the belt against the base of the channel member as the clamp is pulled lengthwise of the belt. This clamp is also insecure when substantial tension is applied to the belt. It is also quite difficult both to use in a raceway and to remove from the belt once its ends are connected.

Another problem with the last-mentioned and the Fedorov, et al. clamping devices is that they are not reversible. The operating environment of conveyor belts often makes it difficult to conveniently fit a clamping device into a raceway in one direction whereas it might be much easier to do so in the opposite direction.

Accordingly, a need remains for a better form of belt clamp for use in connecting the ends of conveyor belts than has been previously known.

SUMMARY OF THE INVENTION

One object of the invention is to more securely clamp the ends of a belt for drawing together and fastening under tension than prior belt clamps do.

A second object of the invention is to clamp the belts across their entire width so as to stretch them uniformly.

A third object is to provide a belt clamp which is conveniently used in raceways.

Another object is to provide a belt clamp which can be used on either very short or very long belts.

A further object is to provide a belt clamp which can be easily removed from a belt after its ends are connected.

The invention is a belt clamp comprising a channel member having a base wall and a pair of parallel sidewalls defining a channel, the length of the channel member being sufficient to span the width of the belt. A bar member sized to span the conveyor belt and fit into the channel together with the thickness of the belt is positioned along the channel member with the belt sandwiched therebetween. A connecting means pivotally interconnects the ends or bar and channel members on opposite sides of the belt so that the bar member can rotate about a pivot axis paralleling the sidewalls of the channel member into the channel, together with the belt. An attachment means is connected to the bar member for attaching to a pulling means for pulling the belt clamp, and thereby the belt, lengthwise in a direction to tension the belt. The attachment means includes means for rotating the bar member about the aforementioned pivot axis into the channel as the belt is pulled lengthwise to engage the belt within the channel.

The channel member can further include means defining a lever arm extending lengthwise along the belt in a direction opposite that which the belt is pulled. As the belt is pulled, the lever arm engages against the belt and thereby resists rotation of the channel member. The channel member can be formed with three parallel walls defining two channels, only one of which is used at a time, the unused sidewall serving as the aforementioned lever arm. The attachment can comprise a rigid member connected to the bar member radially of the pivot axis so that pulling the rigid member lengthwise of the belt rotates the bar member about the pivot axis and into the channel to clamp the belt therein. The greater the pulling force applied to the belt, the greater the clamping force applied to it. The connecting means is preferably detachable at an end of the channel member so that the clamp can be easily removed from the belt after it has been tightened and its ends fastened together. The attachment means on the bar member can be the sole connection of the clamp to the pulling means and need be positioned on only one side of the belt so that the clamp is easily used in raceways. In preferred embodiments, employing a channel member having a symmetric pair of channels, the clamps are operable in both directions. For very wide belts, the channel and bar members can be made correspondingly long and two or more attachment means spaced between its ends to evenly distribute the rotating and pulling forces.

The foregoing and other objects, features and advantages of the invention will become more readily apparent from the following detailed description, which proceeds with reference to the accompanying drawing.

3

BRIEF DESCRIPTION OF THE DRAWING

FIG. 1 is a side sectional view taken on line 1—1 of FIG. 3 showing a belt clamp in accordance with the invention positioned on a conveyor belt for pulling its ends together.

FIG. 2 is a similar view of the clamp of FIG. 1 with the belt sandwiched between its upper bar member and lower channel member but prior to applying a pulling force to the bar member.

FIG. 3 is a top plan view of the clamp of FIG. 1, the belt shown in phantom lines.

FIG. 4 is an exploded perspective view of the clamp of FIGS. 1-3.

FIG. 5 is a top plan view of an alternative embodiment of the clamp of FIGS. 1-4 adapted for very wide belts.

DETAILED DESCRIPTION OF PREFERRED EMBODIMENTS

FIGS. 1-4 Embodiment

Belt clamps 10 in accordance with the invention are ordinarily to be used in identical pairs for clamping a conveyor belt 12 near its ends 14 to pull them together for fastening. Accordingly, only a single such clamp is illustrated in the drawing. Such clamps are used with a conventional hauling device or "come-along" (not shown), like that shown in the aforementioned Cook, et al. patent or otherwise known in the art, but needing only a single cable 16 and hook 18 to each clamp.

Referring to FIGS. 1-4, each clamp 10 comprises a channel member 20, a bar member 22 and a pair of connecting links 24 pivotally interconnecting the bar and channel members at their ends. The conveyor belt 12 is sandwiched between the channel and bar members and such members have a length sufficient to span the full width of the belt.

Referring to FIG. 4, the channel member 20 is a length of shallow structural channel stock having a base wall 26 and a pair of sidewalls 28, 30. A square bar member 32 is welded to base wall 26 centered between sidewalls 28, 30 and parallel thereto to form inner sidewalls of a pair of symmetrical channels 34, 36. A pair of cylindrical posts 38, 40 are coaxially mounted on opposite ends of member 32 for receiving connecting links 24 thereon. Post 38 is fitted with a roll pin 42 for holding its link in place. Post 40 is left without such a pin so that its link is removable.

The bar member 22 is formed of a length of rectangular bar stock 44. A rigid inverted U-shaped loop 46 is centered on its broad upper face 48 and normal thereto to provide means for attaching the clamp to a hauling device via cable 16 and hook 18. A pair of posts 50 like post 38 are coaxially positioned on opposite end faces 52 of bar member 44. A bolt 56 is positioned in a threaded bolt hole 58 extending through the bar member and centered between its side faces 60, 62.

The connecting links 24 have a generally figure-8 shape. Conventional roller chain master links with openings 64 sized to loosely fit posts 38, 40, 50 suffice.

FIG. 5 Embodiment

Clamp 110 of FIG. 5 is of the same overall design as clamp 10, so like reference numerals identify like parts. However, the channel member 120 and bar member 122 are longer than members 20, 22, to accommodate a wide belt 112, for example, over 16 inches wide. The principal difference is the use of two U-shaped loops 46 evenly spaced along the length of bar member 122. Two or more such loops uniformly distribute the pulling and clamping forces lengthwise along bar member 122. In this way, member 122 is kept from bowing, which would allow the belt to slip at its middle and thereby be stretched nonuniformly. An additional bolt 56 may also be provided.

OPERATION

Referring to FIG. 2, with link 24 removed from post 40, channel member 20 is positioned widthwise beneath belt 12 near its end 14, with channels 34, 36 facing the belt. Bar member 22 is positioned above the belt, with loop 46 directed away from the belt and posts 50 aligned with posts 38, 40. Link 24 is then pivoted on post 50 to insert post 40 into opening 64.

The same steps are taken with a second such clamp (not shown) on the opposite end of the belt. If the belt is on a nonhorizontal table, or raceway, bolt 56 can be temporarily tightened to hold the first clamp on the belt while the second belt clamp is being positioned on the opposite end of the belt.

Next, the clamps are connected to a pulling means by attaching cable 16 and hook 18 to loop 46, as shown in FIGS. 1 and 3. The pulling means is then operated to draw the clamps toward one another. This action pivots the loop 46 and thereby member 22 of each clamp on links 42 about parallel pivot axes 74, 76 through posts 38, 49, 50, as indicated by arrow 70 in FIG. 2, until they are positioned as shown in FIGS. 1 and 3. Continuing to pull the clamps in the direction of arrow 72, presses side face 60 of the bar member against the belt to clamp it in channel 34 against base wall 26 and sidewall 28. This action tends to rotate the channel member in the direction of arrow 70, but is counteracted by sidewall 30, acting as a lever arm to engage the underside of the belt. As belt tension is increased, the clamping forces on the belt increase, resisting slippage. Tightening the belt also pushes sidewall 30 down, nearly negating any tendency of the channel member to rotate in the direction of arrow 70.

Once the belt ends 14 meet, they are laced together in conventional fashion. The pulling means is then released to remove tension from the clamps. Link 24 is then slipped off the end of post 40 and the clamp is slid sideways off the recoupled belt.

Operation of the FIG. 5 embodiment is substantially the same as that of the FIGS. 1-4 embodiment. However, two cables (not shown) are connected to loops 46.

Both embodiments are symmetrical (see FIG. 2) so as to be workable in either direction on the same belt. They may alternatively be asymmetrical for use on different thickness belts.

Having illustrated and described the principles of my invention in two preferred embodiments, it should be apparent to those persons skilled in the art that such invention may be modified in arrangement and detail without departing from such principles.

I claim:

1. A belt clamp for a conveyor belt, comprising:
    a channel member having a base wall and a pair of parallel sidewalls defining a channel, the length of the channel member being sufficient to span the width of the belt;
    a bar member sized to span the conveyor belt and to fit into said channel together with a thickness of the belt;

connecting means pivotally interconnecting the bar member and the channel member on opposite sides of the belt so that the bar member can rotate about a pair of spaced-apart pivot axes parallel to the sidewalls into said channel, together with said belt thickness, to engage the belt against the channel member; and attachment means connected to the bar member for attaching the clamp to a belt-pulling means for pulling the belt lengthwise in a direction to tension the belt;

the attachment means including means for rotating the bar member to the channel as the belt is pulled lengthwise.

2. A belt clamp according to claim 1 in which the channel member includes means defining a lever arm extending lengthwise of the belt in a direction opposite the direction to tension the belt for engaging the belt and thereby resisting rotation of the channel member.

3. A belt clamp according to claim 2 in which the attachment means is connected to the bar member intermediate its ends and is the sole connection between the clamp and the belt-pulling means.

4. A belt clamp for a conveyor belt, comprising:
a channel member having a base wall and a pair of parallel sidewalls defining a channel, the length of the channel member being sufficient to span the width of the belt;
a bar member sized to span the conveyor belt and to fit into said channel together with a thickness of the belt;
connecting means pivotally interconnecting the bar member and the channel member on opposite sides of the belt so that the bar member can rotate about a pair of spaced-apart pivot axes parallel to the sidewalls into said channel, together with said belt thickness, to engage the belt against the channel member; and
attachment means connected to the bar member for attaching the clamp to a belt-pulling means for pulling the belt lengthwise in a direction to tension the belt;
the attachment means including means for rotating the bar member into the channel as the belt is pulled lengthwise;
the channel member including means defining a third sidewall parallel to said pair of sidewalls and spaced therefrom to define a second channel, the connecting means being positioned to rotate the bar member about the middle one of said sidewalls into either one of said channels.

5. A belt clamp according to claim 1 in which the attachment means comprises a rigid member connected to the bar member and extending radially of the pivot axis of the bar member to define said rotating means.

6. A belt clamp according to claim 5 in which the rigid member is positioned intermediate the edges of the belt.

7. A belt clamp according to claim 5 in which the attachment means includes two of said rigid members spaced between the ends of the bar member.

8. A belt clamp according to claim 1 in which the connecting means is detachable at an end of the channel member.

9. A belt clamp for a conveyor belt, comprising:
a channel member having a base wall and a pair of parallel sidewalls defining a channel, the length of the channel member being sufficient to span the width of the belt;
a bar member sized to span the conveyor belt and to fit into said channel together with a thickness of the belt;
connecting means pivotally interconnecting the bar member and the channel member on opposite sides of the belt so that the bar member can rotate about a pair of spaced-apart pivot axes parallel to the sidewalls into said channel, together with said belt thickness, to engage the belt against the channel member;
attachment means connected to the bar member for attaching the clamp to a belt-pulling means for pulling the belt lengthwise in a direction to tension the belt; and
a set screw threaded in the bar member for temporarily engaging the belt against the channel member;
the attachment means including means for rotating the bar member into the channel as the belt is pulled lengthwise.

10. A conveyor belt clamp comprising:
a channel member having a length sufficient to span the width of a conveyor belt, the channel member having a pair of parallel sidewalls;
wall means mounted in the channel member and spaced between the sidewalls to define a pair of channels therewith;
a rectilinear bar member extending parallel to said channels and sized to fit therein along with a thickness of conveyor belting;
connecting means for pivotally connecting the bar member to the wall means at each end of the channel member for independently pivoting the bar and channel members about spaced-apart parallel rotational axes; and
attachment means including a rigid attachment member on the bar member, intermediate its ends, for attaching the clamp to a pulling means;
the attachment member being mounted radially of the rotational axis of the bar member so that pulling the attachment member lengthwise of the belt rotates the bar member about said axes into one of said channels to clamp the belt therein.

* * * * *

UNITED STATES PATENT AND TRADEMARK OFFICE
CERTIFICATE OF CORRECTION

PATENT NO. : 4,500,127

DATED : February 19, 1985

INVENTOR(S) : Donald H. Van Derlin

It is certified that error appears in the above-identified patent and that said Letters Patent is hereby corrected as shown below:

```
Column 1, line 27, "such" should be --which--;
Column 2, line 24, "or" should be --of--;
Column 4, line 28, "42" should be --24--;
Column 5, line 13, "to" should be --into--.
```

Signed and Sealed this

Second Day of July 1985

[SEAL]

Attest:

DONALD J. QUIGG

Attesting Officer     Acting Commissioner of Patents and Trademarks